United States Patent [19]

Shaw

[11] Patent Number: 4,914,758

[45] Date of Patent: Apr. 10, 1990

[54] FRESH WATER CONTROL SYSTEM AND METHOD

[75] Inventor: Daniel C. Shaw, Geneva, Fla.

[73] Assignee: Bauer Industries Inc., Orlando, Fla.

[21] Appl. No.: 212,405

[22] Filed: Jun. 27, 1988

[51] Int. Cl.[4] .......... G05D 7/00

[52] U.S. Cl. .......... 4/304; 4/623; 4/661; 137/118; 137/624.12

[58] Field of Search .......... 4/300, 301-305, 4/313, 623, DIG. 3, DIG. 9, 661; 137/624.11, 118, 624.12

[56] References Cited

U.S. PATENT DOCUMENTS

| | | | |
|---|---|---|---|
| 1,985,314 | 12/1934 | Coleman | 4/303 |
| 2,395,150 | 2/1946 | Sloan et al. | 4/303 |
| 2,908,017 | 10/1959 | Whaley | 4/303 X |
| 2,991,481 | 7/1961 | Book | 4/DIG. 3 X |
| 3,066,314 | 12/1962 | Filliung | 4/303 |
| 3,922,730 | 12/1975 | Kemper | 4/10 |
| 4,014,577 | 3/1977 | Clancy et al . | 302/35 |
| 4,041,557 | 8/1977 | Ringler | 4/300 X |
| 4,134,163 | 1/1979 | Matsunaga | 4/302 |
| 4,471,498 | 9/1984 | Robertshaw | 4/302 |
| 4,520,513 | 6/1985 | Raupuk, Jr. et al. | 4/302 |
| 4,562,552 | 12/1985 | Miyaoka et al. | 364/510 |
| 4,624,017 | 11/1986 | Foletta | 4/304 |
| 4,651,777 | 3/1987 | Hardman | 137/487.5 |
| 4,667,350 | 5/1987 | Ikenaga | 4/304 |
| 4,793,588 | 12/1988 | Laverty, Jr. | 251/30.03 |
| 4,815,150 | 3/1989 | Uhlmann | 4/305 |
| 4,835,687 | 5/1989 | Martin | 364/402 |

FOREIGN PATENT DOCUMENTS

| | | | |
|---|---|---|---|
| 1944165 | 3/1971 | Fed. Rep. of Germany | 4/302 |
| 2841235 | 3/1980 | Fed. Rep. of Germany | 4/303 |
| 2587086 | 3/1987 | France . | |
| 2039564 | 8/1980 | United Kingdom | 4/303 |

OTHER PUBLICATIONS

Wiatrowski, Microprocessor Restroom Robot, Apr. 1977, Computer Design, vol. 16, No. 4, pp. 98–100

*Primary Examiner*—Henry J. Recla
*Assistant Examiner*—R. M. Fetsuga
*Attorney, Agent, or Firm*—Shlesinger & Myers

[57] ABSTRACT

The method of controlling operation of a plurality of fixtures comprises the steps of establishing a maximum liquid flow rate and determining which of the fixtures required operation. A determination is then made of the liquid flow rate of the fixture requiring operation and a calculation is made of whether operation of the fixture requiring operation will cause the maximum flow rate to be exceeded. The fixture requiring operation is caused to operate if the maximum flow rate will not be exceeded and is prevented from operating if the maximum flow rate will be exceeded.

53 Claims, 4 Drawing Sheets

FRESH WATER CONTROL SYSTEM AND METHOD

BACKGROUND OF THE INVENTION

Fresh water is an increasingly scarce and expensive natural resource necessary to sustain life. The availability of potable or fresh water frequently is the factor which limits growth of a locality, or even growth within a locality. Not only is the treatment of potable water for consumption expensive, but treatment of the resulting waste water is also of increasing expense on account of treatment and capital costs.

Many modern large facilities, such as office buildings, hotels, stadia and the like, have a demand load for potable water which varies substantially from day to day, and even hour to hour. For example, the demand for potable water during an intermission at a stadium greatly exceeds the demand while the event is underway. Similarly, the demand for potable water on a given floor of a hotel or office building may greatly exceed the demand on other floors.

The ability to expand an existing facility, such as a hospital, is frequently limited by the availability of potable water. Furthermore, the cost of expansion is also related to the water main size which must be provided, and most localities charge access fees of one type or another based upon the meter size required to supply the facility. Frequently, expansion may only occur if the existing water main is removed and replaced by a larger one. In some instances, such as in a hospital, it is not possible to totally deprive the facility of water' thereby prohibiting expansion if the existing water supply is not sufficient.

Current design techniques utilize various factors and extrapolations for estimating the potable water demand of a given facility. Once the demand has been determined, then line size, meter size, main size and the like can be developed based upon this estimated demand. Unfortunately, such estimates are quite crude and do not take into account the wide swings in demand which occur. Furthermore, the resulting line size is generally based upon some percentage of the line size required for total estimated demand because it is accepted that total demand will only infrequently occur. The result of this is, however, that tremendous fluctuations in pressure and flow occur in response to demand, particularly as demand exceeds the percentage factor and approaches 100% demand.

A further complicating factor in sizing water lines is due to the infrequent requirements of the fire and/or water department. For example, utilization of an hydrant will have a tremendous effect on pressure in the main, thereby requiring the water department to place more pumps on line in order to keep pressure constant, or else run the risk of the water main pressure droppinq by too great an amount. Similarly, a broken water main in one location can have an effect on main pressure in another location.

The disclosed invention is a fresh water distribution control system and method which utilizes a plurality of sensors and electromagnetically operated valves in order to precisely control water supply in response to demand. The system and method make maximum utility of the existing water supply in order to smooth out the pressure and flow fluctuations which occur as demand fluctuates The system and method furthermore permit the supply to be adjusted in response to external and internal factors.

OBJECTS AND SUMMARY OF THE INVENTION

The primary object of the disclosed invention is a fresh water distribution system and method which permits fresh water supply to be more precisely correlated with fresh water demand in order to permit maximum utility of existing supplies to be achieved.

A further object of the invention is to provide a system and method which permits the supply to be regulated aperiodically in response to external and internal factors affecting supply and/or demand.

The method of controlling operation of a plurality of fixtures pursuant to the invention comprises the steps of establishing a maximum fluid flow rate. A determination is then made of which of the fixtures requires operation. The fluid flow rate of the fixture requiring operation is determined. A calculation is then made of whether operation of the fixture requiring operation will cause the maximum flow rate to be exceeded. If the maximum flow rate will be exceeded, then operation of the fixture is prevented, and operation is permitted if the maximum flow rate will not be exceeded.

The method of controlling fluid flow to a plurality of fixtures operably connected to a fluid supply and with each fixture utilizing a predetermined quantity of fluid during operation and each fixture having a remotely operable valve for causing operation thereof and each valve operably associated with a controller and a detector means being operably associated with each of the fixtures for detecting usage thereof and the detector means being operably associated with the controller for signaling the need to operate the associated valve includes the steps of establishing a maximum fluid flow rate for the supply. The controller is signaled whenever the need of one of the fixtures to operate arises. The controller determines the fluid flow rate of the fixture needing operation. A determination is then made of whether any other fixture is operating. A calculation is then made of the fluid flow of the operating fixtures and the fluid flow of the fixture requiring operation in order to generate a required fluid flow. The required fluid flow is compared with the maximum fluid flow. Operation of the fixture requiring operation is permitted if required fluid flow is less than maximum fluid flow, and operation is prevented if required fluid flow exceeds maximum fluid flow.

The method of operating a plumbing system comprises the steps of providing a fresh water supply and a sewage drain. A plurality of urinals are provided, with each urinal having an inlet in fluid communication with the supply and an outlet in fluid communication with the drain. A plurality of toilets are provided, and each toilet has an inlet in fluid communication with the supply and an outlet in fluid communication with the drain. A plurality of sinks are provided, each sink having an inlet in fluid communication with the supply and an outlet in fluid communication with the drain. A maximum water flow for the supply is established. A determination is made of which of the sinks, toilets and/or urinals requires operation. An inquiry is then made into whether any other sink, toilet and/or urinal is operating. A calculation is then made of the water flow required for the sink, toilet and/or urinal which is operating and to this is added the water flow required for the sink, toilet or urinal requiring operation in order to determine required flow. Required flow is then compared with maximum flow. The sink, toilet or urinal requiring operation is operated if required flow is less than maximum flow, and is prevented from operating if required flow exceeds maximum flow.

The method of controlling a fluid system comprises the steps of providing a plurality of first, second and third fluid handling means in operable association with a fluid source and a fluid drain, each of the fluid handling means requiring a predetermined volume of fluid to operate and the first means requiring the capability of operation at all non-emergency times. A maximum fluid flow rate for the supply is established. From the maximum fluid flow rate is subtracted the fluid flow required in the event each of the first means are simultaneously operated and thereby a modified flow rate is derived. A determination is then made of which of the second and/or third means requires operation. A calculation is made as to whether operation of the second and/or third means requiring operation will cause the modified fluid flow rate to be exceeded. Operation of the second and/or third means requiring operation is permitted if the modified fluid flow rate will not be exceeded, and is prevented if the modified fluid flow rate will be exceeded.

A fluid control system in combination with a fluid supply and a fluid drain interconnected by a plurality of first, second and third fluid operating means wherein each of the fluid operating means is operable through a remotely controlled valve comprises a plurality of sensors, with each sensor for operable association with one of the fluid operating means for determining the need of the associated fluid operating means to operate. A control means is for operable association with each of the sensors for identifying the fluid operating means requiring operation and for operable association with each of the valves for causing selective operation thereof. The control means includes first means for establishing a maximum fluid flow rate for the supply, calculating means for determining whether operation of the fluid operating means requiring operation will cause the maximum flow rate to be exceeded, and second means for causing operation of the valve of the fluid operating means requiring operation if the maximum flow rate will not be exceeded, and for preventing operation thereof if the maximum fluid flow rate will be exceeded.

A plumbing system comprises a fresh water supply and a waste water drain. A plurality of water operating means are interposed between the supply and the drain, each operating means including a remotely operable valve means for establishing fluid communication between the supply and the drain. A plurality of sensor means are provided, each sensor means positioned proximate one of the operating means for determining when the associated operating means requires operation. A control means is operably associated with each of the sensor means and with the valve means and includes means for identifying the water operating means requiring operation. The control means includes first means for establishing a maximum fresh water flow rate, calculating means for determining whether operation of the operating means requiring operation will cause the maximum flow rate to be exceeded, and second means for causing operation of the valve of the operating means requiring operation if the maximum flow rate will not be exceeded, and for preventing operation if the maximum flow rate will be exceeded.

These and other objects and advantages of the invention will be readily apparent in view of the following description and drawings of the above described invention.

DESCRIPTION OF THE DRAWINGS

The above and other objects and advantages and novel features of the present invention will become apparent from the following detailed description of the preferred embodiment of the invention illustrated in the accompanying drawings, wherein.

DESCRIPTION OF THE INVENTION

Figure 1:
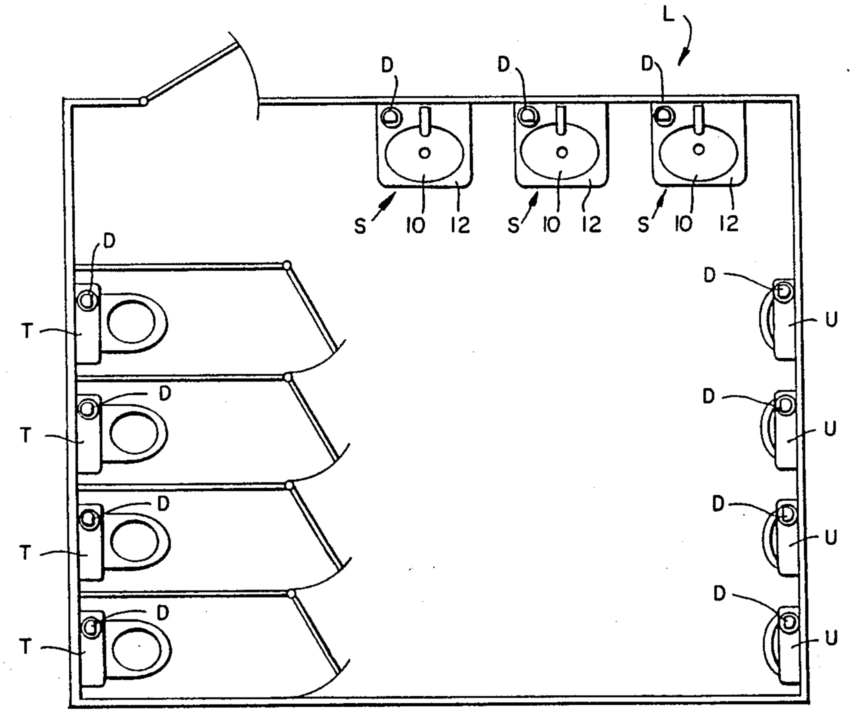
FIG. 1 is a plan view of a lavatory pursuant to the invention.

Lavatory L, as best shown in FIG. 1, has a plurality of toilets T, sinks S and urinals U. While four urinals U and four toilets T are disclosed, those skilled in the art will understand that the invention may be practiced with a greater or fewer number of each, dependent upon the facility involved. Similarly, while three sinks S are disclosed, a greater or fewer number may be utilized pursuant to the invention. Also, while I have disclosed use of the present invention with toilets, sinks and urinals, those skilled in the art will understand that the invention may be practiced with any or all of these, or with other water utilizing fixtures, such as showers, bathtubs, bidets and the like. Furthermore, it is not necessary pursuant to the invention for each of the water operating means to be located in proximity to the others, and it is merely required that there be a plurality of water operating means operable through a Common fresh water supply.

Each of the toilets T, sinks S and urinals U has a detector D positioned proximate thereto in order to determine when the particular toilet T, sink S or urinal U has been used or otherwise requires operation. I prefer that the detectors D be infrared detectors which are based upon generation and detection of a beam of electromagnetic radiation. Other detectors are usable with the invention, but I prefer infrared detectors because an invisible beam of light is utilized. Furthermore, infrared detectors may easily be adjusted with regard to sensitivity and point of detection.

Figure 2:
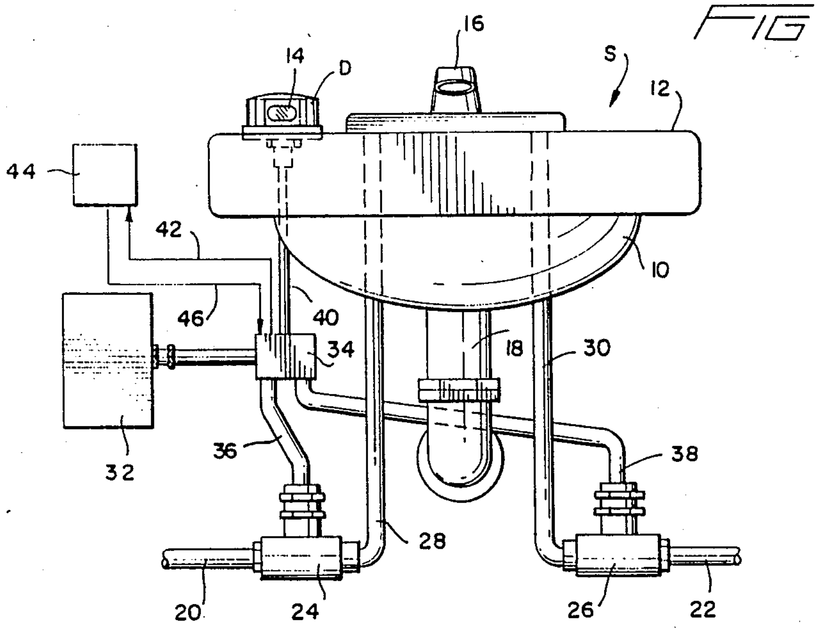
FIG. 2 is a fragmentary elevational view partially in schematic of a sink used in the lavatory of FIG. 1.

Sink S of FIG. 2 is an exemplary disclosure of the utilization of the detector D in order to provide fresh water from a supply and waste water to a drain. Those skilled in the art will understand that the toilets T and urinals U have similar operating mechanisms analogous to those provided with sink S, and it is belieVed that no further discussion thereof is necessary.

Sink S has a bowl 10 and a top 12 to which detector D is mounted. It can be noted in FIG. 2 that detector D has an oval-shaped eye 14 which is not opaque to infrared radiation in order to permit the beam to be focused onto some point within the area of bowl 10 in order to determine when utilization of sink S is required. Naturally, sink S has a spout 16 and a drain 18.

Fresh water supply lines 20 and 22 are connected with solenoid valves 24 and 26, respectively, and from there to faucet 16 through lines 28 and 30. Preferably, one of the fresh water lines 20 and 22 supplies cold water, while the other of the lines supplies hot water so that warm water issues from faucet 16 into bowl 10. Naturally, toilets T or urinals U would not require a hot water supply line, and would merely require a single solenoid for operation.

Transformer 32 supplies operating power to the solenoid valves 24 and 26 through control unit 34. Conduits 36 and 38 extend between control unit 34 and solenoid valves 24 and 26, respectively, and house the wiring which permits the transformer 32 to supply operating power to the solenoids 24 and 26. The detector D is similarly operably connected to the control unit 34 through conduit 40 so that the need to operate faucet 16 can be signaled to control unit 34, and from there through line 42 to central controller 44. The controller 44, which includes a microprocessor or other similar programmable device, determines, as will be further explained, whether the faucet 16 can be operated and, if so, transmits an operating signal through line 46 to control unit 34. In this way, the faucet 16 can only operate when the controller 44 appropriately instructs the control unit 34, and thereby the solenoid valves 24 and 26.

Figure 4:
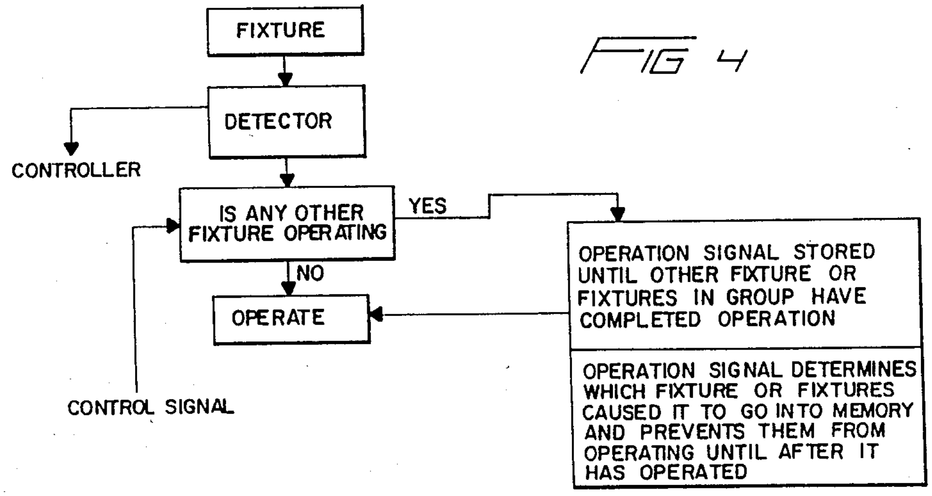
FIG. 4 is a schematic view of the control system of the invention.

FIG. 4 discloses a schematic diagram illustrating how the controller 44 determines whether the faucet 16, or any of the toilets T or urinals U may be operated. In this regard, the particular detector D, which is operably associated with the fixture, signals the controller 44 that there is a need for operation of that fixture. I prefer that the sinks S always be operable, except in emergency conditions, when the hands of a user are placed under the faucet 16. Operation of the toilets T and urinals U, on the other hand, should be delayed, at least until after usage thereof has been completed. This prevents excessive usage of water.

Once the detector D of a particular fixture T, S or U senses a need for operation, then the controller 44 is notified. The controller 44 then determines whether any other fixture is operating and if none are, operation of the particular fixture is normally authorized. Should some other fixture be operating, or should there be insufficient water supply for operation, then the operation signal is stored in memory. The operation requests stored in memory are, preferably, sequentially arranged in the order in which the requests are transmitted by the detectors D. This assures that any fixture which operates while any other fixture is prevented from operating will not be capable of subsequent operation until such time as the fixture in memory is operated. In other words, the memory operates on a first in, first out principle which assures that the fixtures operate in the order in which the operation requests are received.

Figure 5:
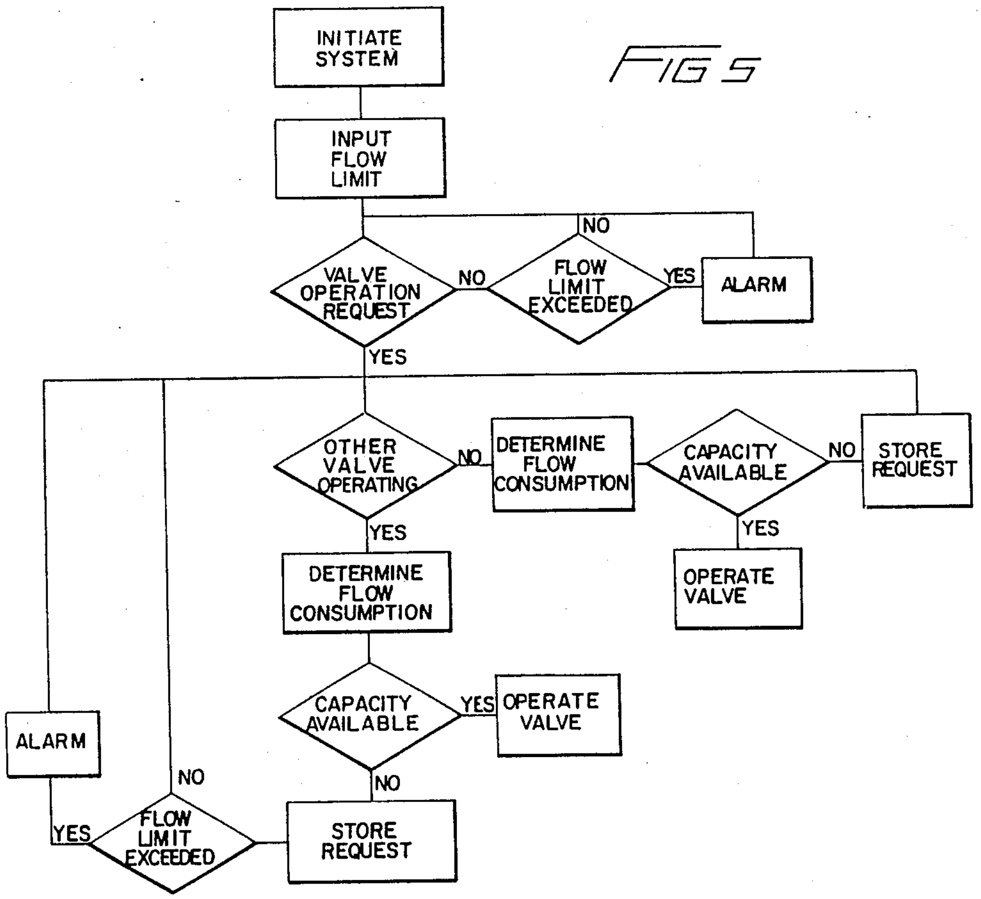
FIG. 5 is a logic diagram of the control system of FIGS. 3 and 4; and, FIG. 6 is an elevational view, partially in section, of a building utilizing the invention.

FIG. 5 illustrates a logical flow chart of the algorithm utilized by the controller 44 in determining whether a particular fixture T, S or U may operate when request is made. Naturally, the system is energized and a maximum flow rate for the potable water supply is input by the operator. The algorithm then determines whether any of the solenoid valves requires operation based upon the operation requests transmitted by the detectors D. Should no operation be requested, then the algorithm determines whether the maximum flow rate is being exceeded. If it is, then an alarm is sounded. I have found that the flow limit may be exceeded if a particular solenoid valve does not properly close and thereby stop water flow. This may occur because I utilize a timer for controlling operation of the solenoid valves once the operation signal is transmitted. Therefore, a particular solenoid valve may remain open and this will not be detected by the controller 44 because the controller 44 assumes that the particular solenoid closes when the timer runs out.

Should there be a valve operation request, then the algorithm identifies the valve of interest and queries whether any other valves are operating. If none are operating, then the algorithm determines the water flow required to operate the particular fixture requesting operation and then determines whether sufficient capacity is available from the supply. If there is sufficient capacity, then the particular valve is caused to be operated. Should there not be sufficient capacity, then the operation request is stored so that the valve may be operated when sufficient capacity is available.

Should some other valve be operating, then the algorithm determines the required water flow by adding the water flow of the valves which are operatinq to the water flow of the valve which is requesting operation. The algorithm compares the required water flow with the maximum water flow previously input and, if the maximum flow rate will not be exceeded by combined operation, then the particular valve is caused to operate. If, on the other hand, the required water flow would exceed the maximum flow rate, then the operation request is stored in memory.

Even though valve operation requests are stored in memory, thereby indicating insufficient flow capacity in the supply, the algorithm still queries whether the maximum flow limit is being exceeded. If the maximum flow limitation is being exceeded, such as by a solenoid valve not properly closing, then an alarm is again sounded. The alarm may be audible or visual and will, preferably, be perceivable in some control room remotely located from the lavatory L wherein the controllers 34 are positioned. A technician can then proceed to the lavatory in order to determine the cause of the malfunction and take appropriate corrective action. Preferably, the flow rate is determined by some type of flow meter in line with the fresh water supply line.

I have found that a sink requires approximately one gallon per minute of water in order to operate. A urinal, on the other hand, requires approximately three gallons per minute and a toilet approximately five gallons per minute. The varying flow requirements of the fixtures T, S and U require that the algorithm of FIG. 5 first determine the type of fixture requiring operation in order to calculate required water flow . Merely determining the number of fixtures requiring operation would not be satisfactory, or could be so if flows were uniform.

Figure 6:
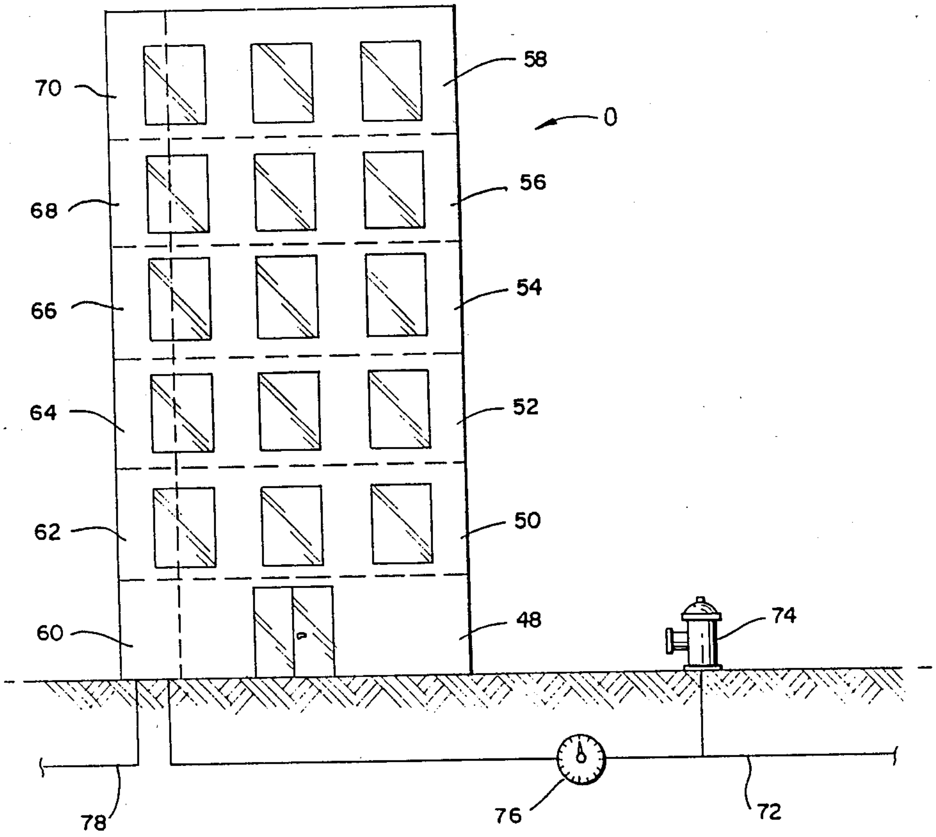

FIG. 6 discloses office building 0 having floors 8, 50, 52, 54, 56 and 58. Each of the floors has a corresponding lavatory 60, 62, 64, 66, 68 and 70 and the lavatories are similar to the lavatory L of FIG. 1. Fresh water main 72 has an hydrant 74 and a meter 76 in order to determine the water consumption of the office building 0. Naturally, the line 72 feeds each of the lavatories 60, 62, 4, 66, 68 and 70 through appropriate lines. Sewage line 78 leads from the office building 0 in order to communicate waste water from the lavatories 60, 62, 64, 66, 68 and 70 to an appropriate treatment facility.

Figure 3:
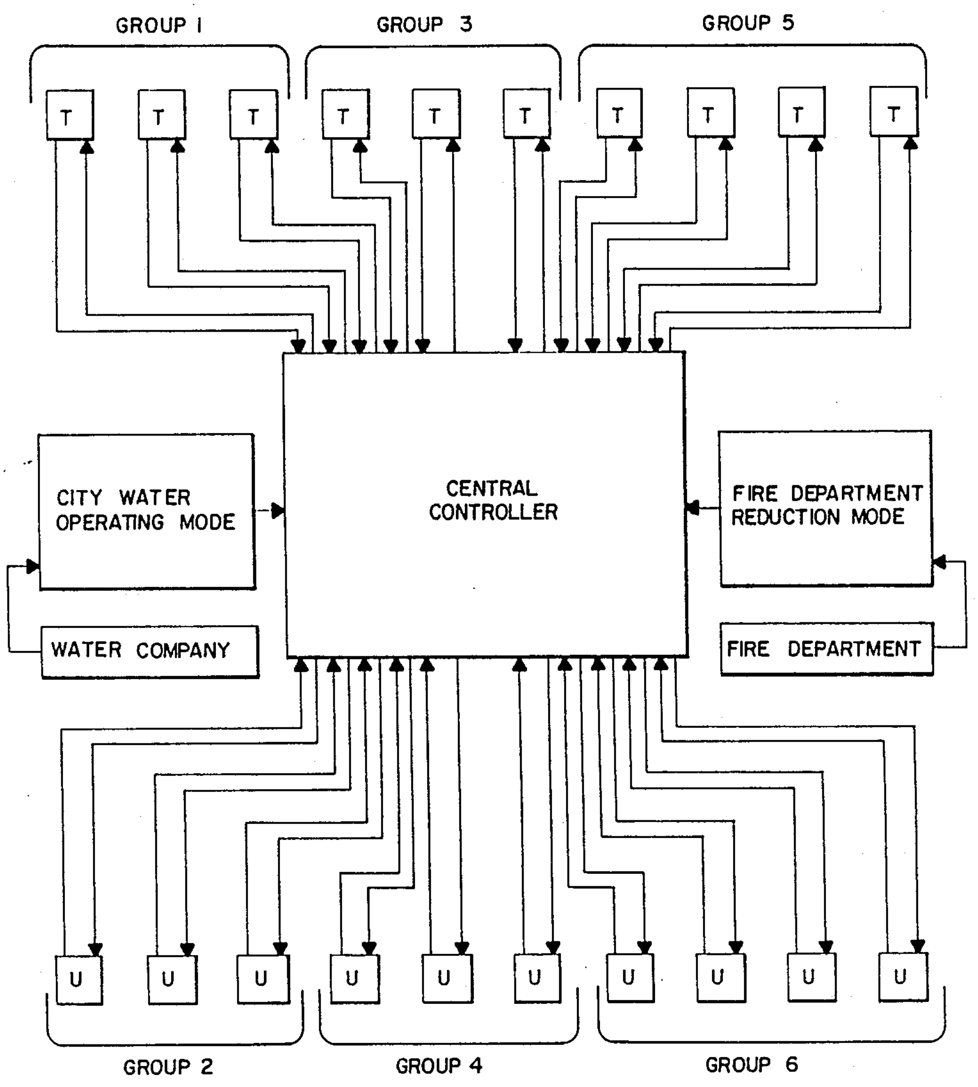
FIG. 3 is a schematic view of a plurality of lavatories controlled pursuant to the invention.

I have found that the lavatories of an office building may all be controlled through a central controller, rather than requiring a single controller for each particular lavatory. For this reason, as best shown in FIG. 3, I arrange the urinals U, toilets T and, where appropriate, the sinks S into a plurality of groups or operating units, with each group being associated with a particular lavatory or floor. For example, groups 1 and 2 of FIG. 3 represent the toilets T and urinals U, respectively, of a particular lavatory. Groups 3 and 4, on the other hand, represent the toilets T and urinals U, respectively, of some other lavatory, while groups 5 and 6 represent the toilets T and urinals U, respectively, of yet a further lavatory. It can be noted in FIG. 3 that there is no requirement that the groups have the same number of toilets and/or urinals and, further, there is no need for there to be a Common number of toilets and/or urinals or other fixture in a particular group. Likewise, the laVatories may be on various floors or on the same floor depending upon the particular building. It is not unusual for there to be a particular water demand in one part of a building which substantially differs from the demand in some other part, and the system of FIG. 3 can accommodate these competing demands in a manner which maximizes water utility for each and for main 72.

It can be noted in FIG. 3 that the sinks S have been omitted, although they would also be appropriately grouped. This is because I prefer that the sinks S always be capable of operation in view of the need to maintain sanitary, hygienic conditions. It is conventional for urinals to be periodically operated in conventional buildings, and operation of toilets can also be temporarily delayed. Sinks, however, should always be capable of operation except in cases of dire emergency.

It can further be noted in FIG. 3 that the central controller, which corresponds to the controller 44 of FIG. 2, has an input from the fire department. Similarly, there is an input from the local water company. Other inputs may be utilized where appropriate and may communicate with controller 44 by radio, telephone line or the like. The water company and the fire department may advise the central controller of an unusual demand load on the water main 72, such as by the need to operate hydrant 74. The controller 44, when so advised, can thereby automatically decrease the maximum flow for any on all of the groups as a means for maintaining constant pressure and flow. This will assure satisfactory operation of the toilets T, sinks S and urinals U, while also permitting hydrant 74 to operate.

As noted, the central controller 44 first establishes a maximum fresh water flow rate for each of the supply lines leading to the lavatories and/or groups under control. There is no requirement that the maximum flow rate for the lavatories or groups be uniform and, instead, it is preferred that the maximum flow rate for each particular lavatory or group be set based upon its own particular demand. Once the maximum water flow rate has been established, then the central controller 44 may then cause selective operation of any solenoid valve requiring operation based upon the available supply. Furthermore, the controller 44 can, when appropriate, prevent operation of the urinals U, toilets T or even sinks S if an emergency arises. Furthermore, the controller 44 may be programmed to delay operation of a fixture for a selected time, even if supply is available.

Those skilled in the art will understand that utilization of the controller 44 to regulate the maximum flow permitted in any particular supply line is one means of assuring maximum utilization of the available fresh water supply. This capability can be utilized to permit a particular facility to expand even though the available water main is not capable of supplying all of the water which would be required for conventional plumbing operation. Instead, the controller 44 can be programmed to spread out the available water supply by appropriate regulation of the solenoid valves utilized to operate the various fixtures. For example, assuming that a particular water main has a capacity of 100 gallons per minute and the existing facility, based upon conventional estimating techniques, is utilizing 75 gallons a minute then the controller may be programmed to permit the addition of yet a further facility consuming, by conventional estimating techniques, 75 gallons per minute. The controller can regulate utilization of the available 100 gallons per minute in a manner which substantially equates to the prior estimate of 150 gallons per minute. This is possible because the controller 44 can prevent operation of certain of the fixtures for a relatively short period when demand exceeds supply. This delay would be almost imperceptible to the user.

As noted, I prefer that certain of the fixtures, such as the sinks S, always be capable of operation except in certain extreme emergency conditions. In order to permit this to occur, then the water flow which would be required to operate each of the sinks S is subtracted from the maximum water flow rate input to the controller 44 by the operator. The calculating means of controller 44 essentially disregards any operation request from a detector D of a sink S and permits the associated valves of the sink S to be immediately operated. The controller 44 operates the toilets T and the urinals U based upon the modified maximum flow rate which is derived by subtraction of the flow rate required to operate the sinks S. Naturally, as noted, control over the sinks S may be appropriate in emergency conditions. Similarly, it may also be appropriate to assure operation of other fixtures, such as showers, bathtubs or the like.

While this invention as been described as having a preferred design, it is understood that it is capable of further modifications uses and/or adaptations thereof and following in general the principle of the invention and including such departures as come within known or customary practice in the art to which the invention pertains.

What I claim is:

1. The method of controlling operation of a plurality of liquid operable fixtures, each fixture having a liquid flow rate and the liquid flow rate of at least one fixture differing from the liquid flow rate of at least one other fixture, comprising the steps of:

(a) establishing a maximum liquid flow rate;
(b) determining which of the fixtures requires operation;
(c) determining the liquid flow rate of the fixture requiring operation;
(d) calculating whether operation of the fixture requiring operation will cause the maximum flow rate to be exceeded; and
(e) causing the fixture requiring operation to operate if the maximum flow rate will not be exceeded and preventing operation of the fixture requiring operation until sufficient liquid capacity is available if the maximum flow rate will be exceeded.

2. The method of claim 1, including the step of:

(a) determining the fixture requiring operation with sensor means, and a sensor means being operably associated with each of the fixtures.

3. The method of claim 2, including the step of:

(a) determining the fixture requiring operation with infrared sensor means.

4. The method of claim 2, including the step of:

(a) determining the fixture requiring operation with electromagnetic sensor means.

5. The method of claim 1, including the step of:

(a) determining Whether any other fixture is operating prior to calculating whether operation of the fixture requiring operation will cause the maximum flow rate to be exceeded.

6. The method of claim 1, including the step of (a) preventing subsequent operation of any fixture which operates while the fixture requiring operation is prevented from operating.

7. The method of claim 1, including the step of:

(a) establishing the maximum flow rate in response to a remotely located controller.

8. The method of claim 1, including the step of'

(a) preventing operation of a fixture requiring for a preselected period.

9. The method of claim 1, including the step of:

(a) establishing the maximum flow rate as a function of external demands.

10. The method of claim 1, including the step of:

(a) sequentially operating the fixtures requiring operation which are prevented from operating.

11. The method of controlling liquid flow to a plurality of liquid operable mixtures operably connected to a liquid supply and with each fixture utilizing a predetermined quantity of liquid during operation and the predetermined quantity of at least one fixture being different from the predetermined quantity of at least one other fixture and each fixture having a remotely operable valve for causing operation thereof and each valve operably associated with a controller and a detector means being operably associated with each of the fixtures for detecting usage thereof and the detector means being operably associated with the controller for signaling a need to operate the associated valve, comprising the steps of:

(a) establishing a maximum liquid flow rate for the supply;

(b) signaling the controller the need of one of the fixtures to operate;

(c) determining the liquid flow rate of the fixture needing operation;

(d) determining whether any other fixture is operating;

(e) calculating the liquid flow of the operating fixtures and adding to that the liquid flow of the fixture needing operation and thereby generating a required liquid flow rate;

(f) comparing the required liquid flow rate with the maximum liquid flow rate; and, (g) operating the fixture needing operation if the required liquid flow rate is less than the maximum liquid flow rate and preventing operation of the fixture needing operation if the required liquid flow rate exceeds the maximum liquid flow rate.

12. The method of claim 11, including the step of:

(a) preventing operation of any fixture which operates while the fixture needing operation is prevented from operating.

13. The method of claim 11, including the steps of:

(a) determining whether the maximum liquid flow rate is being exceeded; and, (b) operating an alarm if the maximum liquid flow rate is being exceeded.

14. The method of claim 11, including the step of:

(a) establishing the maximum liquid flow rate in response to external demands on the supply.

15. The method of claim 11, including the step of:

(a) delaying for a selected period operation of any fixture needing operation.

16. The method of operating a plumbing system, comprising the steps of:

(a) providing a fresh water supply and a sewage drain;

(b) providing a plurality of urinals, each urinal haVing an inlet in fluid communication with the supply and an outlet in fluid communication with the drain;

(c) providing a plurality of toilets, each toilet having an inlet in fluid communication with the supply and an outlet in fluid communication with the drain;

(d) providing a plurality of sinks, each sink having an inlet in fluid communication with the supply and an outlet in fluid communication with the drain;

(e) establishing a maximum water flow for the supply:

(g) determining which of the sinks, toilets and/or urinals requires operation;

(h) determining whether any other sink, toilet and/or urinal is operating;

(i) determining the water flow of the sink, toilet and/or urinal which is operating and adding thereto the water flow of the sink, toilet or urinal requiring operation and thereby determining required flow;

(j) comparinq the required flow with the maximum water flow; and, (k) operating the sink, toilet or urinal requiring operation if required flow is less than maximum water flow and preventing operation of the sink, toilet or urinal requiring operation if the required flow exceeds the maximum water flow.

17. The method of claim 16, including the step of:

(a) preventing subsequent operation of any sink, toilet or urinal which operates while the sink, toilet or urinal requiring operation is prevented from operating.

18. The method of claim 16, including the step of:

(a) delaying for a selected period operation of any sink, toilet or urinal requiring operation.

19. The method of claim 16, including the step of:

(a) determining which of the sinks, toilets or urinals operation through a sensor means operably associated therewith and remote therefrom.

20. The method of claim 19, including the step of:

(a) providing electromagnetic detector means as the sensor means.

21. The method of claim 16, including the step of:

(a) arranging the sinks, toilets and urinals into a plurality of groups, each group comprising at least one sink, toilet and urinal.

22. The method of claim 21, including the steps of:

(a) establishing a maximum water flow for each of the groups; and, (b) operating the toilet, sink or urinal of each group with reference to the maximum water flow for the associated group.

23. The method of claim 22, including the step of:

(a) establishing the maximum water flow for at least one group which differs from the maximum water flow for at least one other group.

24. The method of claim 16, including the step of:

(a) establishing the maximum water flow in response to external demands on the supply.

25. The method of claim 16, including the steps of:
(a) deleting from the maximum water flow the water flow required to operate the sinks;
(b) disregarding the water flow required for a sink when calculating required flow; and,
(c) always permitting a sink to operate.

26. A method of controlling a fluid system, comprising the steps of:
(a) providing a plurality of at least first, second and third fluid handling means in operable association with a fluid source and a fluid drain, each of the fluid handling means requiring a predetermined volume of fluid to operate and the first means requiring the capability of operation at all non-emergency times;
(b) establishing a maximum fluid flow rate for the supply;
(c) deriving a modified flow rate by subtracting from the maximum fluid flow rate the fluid flow required in the event each of the first means are simultaneously operated;
(d) determining which of the second and/or third means requires operation;
(e) calculating whether operation of the second and/or means requiring operation will cause the modified flow rate to be exceeded; and,
(f) operating the second and/or third means requiring operation if the modified flow rate will not be exceeded and preventing operation of the second and/or third means requiring operation if the modified flow rate will be exceeded.

27. The method of claim 26, including the step of:
(a) preventing subsequent operation of any one of the second and/or third means which operates prior to operation of the second and/or third means prevented from operating.

28. The method of claim 26, including the step of:
(a) determining which of the second and/or third means requires operation through sensor means, there being a sensor means proximate to and operably associated with each of the second and/or third means.

29. The method of claim 28, including the steps of:
(a) providing each of the second and third means with at least one electromagnetic valve means interposed between the source and the drain;
(b) interconnecting each of the electromagnetic valve means with an associated one of the sensor means; and,
(c) operating the electromagnetic valve means in response to the associated sensor means.

30. The method of claim 26, including the step of:
(a) adjusting the maximum flow rate in response to external demands on the supply.

31. The method of claim 26, including the steps of:
(a) arranging the first, second and third means into a plurality of groups, with each group comprising at least one first, second and third means;
(b) establishing a maximum flow rate for each group;
(c) deriving a modified flow rate for each group by subtracting from the maximum flow rate for each group the fluid flow required in the event each first means of the group should be simultaneously operated;
(d) determining for each group which of the second and/or third means requires operation;
(e) calculating for each group whether operation of second and/or third means requiring operation will Cause the group modified flow rate to be exceeded; and,
(f) operating the second and/or third means requiring operation if the group modified flow rate will not be exceeded and preventing operation of the second and/or third means requiring operation if the group modified flow rate will be exceeded.

32. The method of claim 31, including the step of:
(a) establishing a maximum flow rate for one of the groups differs from the maximum flow rate for at least one other group.

33. The method of claim 31, including the steps of:
(a) providing a sink as the first means;
(b) providing a toilet as the second means; and,
(c) providing a urinal as the third means.

34. A liquid control system for combination with a liquid supply and a liquid drain interconnected by a plurality of first, second and third liquid operating means wherein each of the liquid operating means is operable through a remotely controlled valve and the liquid flow rate of at least one of the operating means is different than the liquid flow rate of at least one other of the operating means, the liquid control system comprising:
(a) a plurality of sensors, each sensor for operable association with one of the liquid operating means for determining the need of the associated liquid operating means to operate; and,
(b) control means for operable association with each of said sensors for identifying the liquid operating means requiring operation and for operable association with each of the valves for causing selected operation thereof, said control means includes first means for establishing a maximum liquid flow rate for the supply, calculating means for determining whether operation of the liquid operating means requiring operation will cause the maximum flow rate to be exceeded, and second means for causing operation of the valve of the liquid operating means requiring operation if the maximum flow rate will not be exceeded and for preventing operation of the valve of the liquid operating means requiring operation if the maximum flow rate will be exceeded.

35. The system of claim 34, wherein:
(a) each of said sensor means is a radiant energy detector.

36. The system of claim 35, wherein:
(a) each of said detectors is an infrared sensor.

37. The system of claim 34, wherein:
(a) said control means further includes third means for preventing subsequent operation of any of the liquid operating means which operates prior to operation of the liquid operating means requiring operation and prevented from operating by said second means.

38. The system of claim 34, wherein:
(a) said control means includes means for adjusting the maximum flow rate.

39. The system of claim 34, wherein:
(a) said control means includes means for selectively grouping said sensors into a plurality of operating units so that a maximum flow rate is established for each unit and said calculating means and said second means cause operation of a liquid operating means in a unit in response to the maximum liquid flow rate for the associated unit.

40. The system of claim 39, wherein:

(a) said control means includes means for independently the maximum flow rate for each unit.

41. The system of claim 34, wherein:

(a) said control means includes means for delaying for period operation of the first, second and third liquid operating means.

42. The system of claim 34, wherein said control means includes:

(a) means for subtracting from the maximum flow rate the liquid flow required if each of any of a selected one of the liquid, operating means is operated so that operation of any one of the selected one of the liquid operating means is assured.

43. A plumbing system, comprising:

(a) a fresh water supply and a Waste water drain;

(b) a plurality of water operating means interposed said supply and said drain, each operating means includes a remotely operable valve means for establishing fluid communication between said supply and said drain;

(c) a plurality of sensor means, each sensor means proximate one of said water operating means for determining when the associated operating means requires operation; and, (d) control means operably associated with each of said sensor means and with said valve means and including means for identifying the water operating means requiring operation, said control means further includes first means for establishing a maximum fresh water flow rate, calculating means for determining whether operation of the operating means requiring operation will cause the maximum flow rate to be exceeded, and second means for causing operation of the valve of the operating means requiring operation if the maximum flow rate will not be exceeded and for preventing operation of the water operating means requiring operation if the maximum flow rate will be exceeded.

44. The system of claim 43, wherein:

(a) each of said sensor means is an infrared sensor.

45. The system of claim 43, wherein:

(a) said control means includes means for adjusting the maximum flow rate.

46. The system of claim 43, wherein:

(a) said control means includes means for preventing subsequent operation of any operating means which operates while the operating means requiring operation is prevented from operating.

47. The system of claim 43, wherein:

(a) said control means includes means operably with said supply for determining whether the maximum flow rate is being exceeded and for providing an alarm in response thereto.

48. The system of claim 43, wherein said operating means includes:

(a) a plurality of first operating means having a first predetermined water flow rate;

(b) a plurality of second operating means having a second predetermined water flow rate; and, (c) a plurality of third operating means having a third predetermined flow rate.

49. The system of claim 48, wherein said control means includes:

(a) means for calculating the total water flow rate by operation of all of any selected one of said first, second and third operating means; and, (b) means for subtracting the total water flow rate from the maximum water flow rate and thereby deriving a modified maximum flow rate and for causing the modified maximum flow rate to be substituted for the maximum flow rate so that operation of any one of the selected first, second and third operating means is assured.

50. The system of claim 49, wherein:

(a) said control means includes means for selectively arranging said sensor means into a plurality of groups and for establishing a maximum flow rate for each group so that operation of the means of a group is dependent upon the maximum flow rate for the selected group.

51. The system of claim 50, wherein:

(a) said control means includes means for independently establishing the maximum flow rate for each group.

52. The system of claim 49, wherein:

(a) said first operating means includes a sink;

(b) said second operating means includes a urinal; and, (c) said third operating means includes a toilet.

53. The system of claim 43, wherein:

(a) said control means includes means for delaying for a selected period of operation of said operating means.

* * * * *